G. LAUBE. 2 Sheets—Sheet 1.
Assignor, by direct and mesne assignments, to the UNITED STATES STOVE COMPANY.
STRAW BURNING COOK STOVE.
No. 11,063. Reissued Mar. 4, 1890.
*Fig. I*
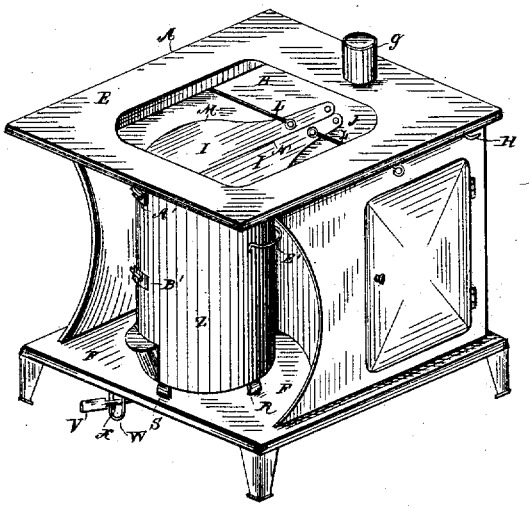
*Fig. II.*
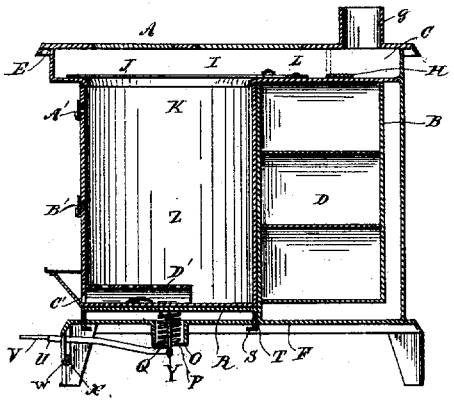
Witnesses
Emma F. Elmore
A. H. Opsahl
Inventor
Godfried Laube
By his Attorney
Jas. F. Williamson
N. PETERS, Photo-Lithographer, Washington, D. C.

G. LAUBE. 2 Sheets—Sheet 2.
Assignor, by direct and mesne assignments, to the UNITED STATES STOVE COMPANY.
STRAW BURNING COOK STOVE.
No. 11,063. Reissued Mar. 4, 1890.
*Fig. III*
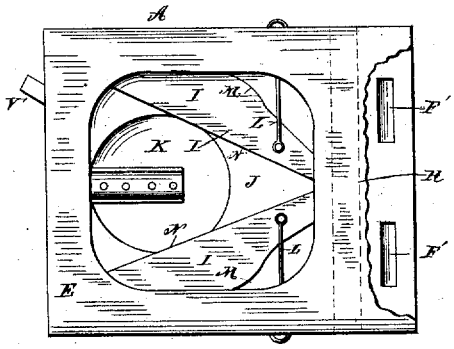
*Fig. IV.*
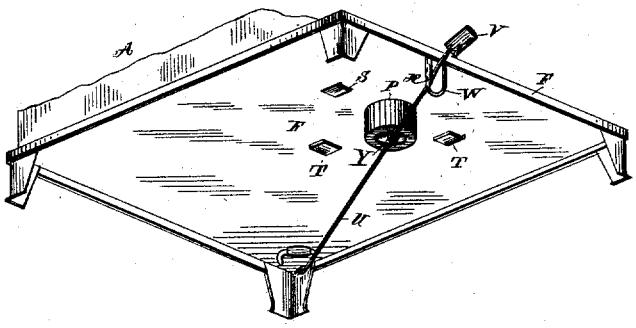
Witnesses
Emma F. Elmore
A. H. Opsahl.
Inventor
Godfried Laube
By his Attorney
Jas. F. Williamson
N. PETERS. Photo-Lithographer, Washington, D. C.

UNITED STATES PATENT OFFICE.

GODFRIED LAUBE, OF HURON, (DAKOTA TERRITORY,) SOUTH DAKOTA, ASSIGNOR, BY DIRECT AND MESNE ASSIGNMENTS, TO THE UNITED STATES STOVE COMPANY, OF MINNEAPOLIS, MINNESOTA.

STRAW-BURNING COOK-STOVE.

SPECIFICATION forming part of Reissued Letters Patent No. 11,063, dated March 4, 1890.

Original No. 389,392, dated September 11, 1888. Application for reissue filed December 11, 1888. Serial No. 294,022.

*To all whom it may concern:*

Be it known that I, GODFRIED LAUBE, a citizen of the United States, and a resident of Huron, in the county of Beadle and Territory of Dakota, have invented certain new and useful Improvements in Straw-Burning Cook-Stoves; and I do hereby declare that the following is a full, clear, and exact description of the invention, which will enable others skilled in the art to which it appertains to make and use the same, reference being had to the accompanying drawings, which form a part of this specification, and in which—

Figure I is a perspective view of my improved straw-burning cook-stove with the spider and covers removed to more fully illustrate my invention. Fig. II is a vertical sectional view of the same with the spider and lids in place upon the stove. Fig. III is a top plan view with the spider and lids removed and a portion of the top broken away to more clearly show the draft-holes in the rear portion of the stove, and Fig. IV is a perspective view of the under side of the stove.

Similar letters of reference denote corresponding parts in all the figures.

My invention has relation to straw-burning cook-stoves; and it consists in the features hereinafter described, and pointed out in the claims.

Hitherto straw-burning cook-stoves have been constructed with magazines applied to the top plate of the stove, open on their bottom and closed on all other sides, and burning the straw upward away from the draft. This class of burners are objectionable on account of imperfect combustion, the offensive gases and smoke which escape into the room, and the great amount of litter produced about the stove. The gases, being deprived of any outlet by their natural course, accumulate in the top of the magazine until they reach a certain pressure, and then force themselves out through the joint with the stove, carrying along with them the smoke, ashes, and refuse material, thereby constituting such a nuisance as to render the stove almost impracticable.

With my invention the straw is burned from the top, which registers with an opening in the under plate of the pot-flue space of the stove-frame. The gases escape in the natural way by rising from the top and passing to the exit-flue. The straw is dried before it comes in contact with the flame. The ashes and other refuse are retained in the magazine, the magazine thus constituting its own ash-pan, which can be conveniently emptied when removed from the stove for refilling with straw. By the use of a relay of magazines of this kind a cooking-stove is obtainable which is as free from escaping gases, ashes, and refuse material as the ordinary wood or coal stove. The magazine may be detachably connected to the stove by any suitable locking-device. I preferably use for the purpose a vertically-movable false bottom or platform mounted on the stove-frame directly under the opening with which the open top of the magazine is to register. The magazine rests on this platform. The platform is lowered for the removal of the magazine and raised to clamp it to the stove-frame in registration with said opening. For effecting the vertical movement of the platform I have herein shown a spring to move it in one direction and a lever to move it in the other. It will be readily understood that the spring may be dispensed with and both movements be effected by a lever, an eccentric, or a screw.

I will now give a detailed description of the construction shown.

In the accompanying drawings, the letter A denotes the stove proper, constructed with the rear and upper communicating hot-air chambers B and C, respectively, the oven D, top-extension E, and hearth-extension F.

*g* indicates the stove-pipe, and H the ordinary draft-regulating damper, secured in the rear portion of the top oven forward of the stove-pipe.

Two dampers I are pivoted with their rear ends to the partition J, which forms the upper hot-air chamber, and are adapted to be operated laterally over the circular opening K in the forward portion of the said partition J by means of pivoted operating-rods L, which project through apertures in the sides of the stove and which are provided with handles. Each of these dampers is constructed of sheet metal and formed with curved outer edges M and with inner straight edges N.

The hearth-extension is formed with a circular opening O, which is encircled by a short downwardly-projecting cylindrical shell P, in which is seated a coil-spring Q of stiff tension. To the upper portion of this spring are secured the clamping-arms R, the lower ends of which are bent downwardly and project through slots S in the hearth-extension, and are then formed with hooks T, the object of which construction is to prevent the said ends from working out of the slots when the coil-spring raises the clamping-arms. An operating-lever U is fulcrumed to the under side of the stove to the rear and extends diagonally across, and is provided with a flat plate or foot-piece V. The forward end of this lever moves vertically in a guide W, secured to the forward under portion of the stove, which guide is provided with a catch X, the object of which will be hereinafter fully set forth. The intermediate portion of this operating-lever is connected to the clamping-arms by a compound hook Y, passing up through the coils of the spring and secured to the clamping-arms where they cross and are secured to each other.

Z represents the cylindrical magazine in which the straw or hay to be burned is placed. This magazine is closed on all sides except at its top, which is open, adapting it to register with the opening K in the stove-top extension E. It is provided with an interior perforated draft-tube D′ on its bottom, communicating with the exterior of the magazine through opening C′ in one of its side walls. The air to support combustion is thus supplied from the bottom through the tube D, and, passing up through the mass of straw, loosens it up and assists in drying it out, while all the gases pass from the top directly to the pot-flues. In addition to the tube D′ the magazine may be provided with additional draft-openings at different levels in one side. A′ and B′ represent doors covering such openings.

E′ are handles on the sides of the magazine.

The general operation of my invention is clear from the description given.

The operation of the other devices shown is as follows: The operating-lever is depressed, carrying with it the clamping-arms, and is then hooked into the catch upon the guide. While in this position the magazine filled with fuel (straw or hay) is placed upon the said clamping-arms, with its open top registering with the circular opening of the top partition. The operating-lever is now thrown out of engagement with the catch of the guide, which causes the spring to force the clamping-arms upwardly and to firmly clamp the magazine to the top extension of the stove, or, rather, to the metallic top partition above mentioned. The fuel is lighted and the draft-doors in the magazine are regulated as desired, and the hot air now passes upwardly into the air-chamber C and furnishes a sufficient quantity of heat for cooking upon the top of the stove, passes back and then downwardly through two openings F′ in the top of the partition, and thus heats the oven. Now, should it be desired to heat the oven more on one side than on the other, the slide-damper upon the side of the stove that is to receive the most heat is moved from over the circular opening of the top partition to one side by the operating-rod, thus permitting the hot air to escape from the magazine and to circulate more upon the side where desired than upon the other. This is a great advantage, for when cooking different eatables at the same time on top or in the oven of the stove one may require a great deal of heat, while it is only necessary to warm the other; but should it be desired to heat all parts of the oven alike both the operating-rods are pulled all the way out or far enough to give the desired heat.

The hollow top section of the stove and its productions—such as the chambers B C, the extension E, or other similar conduits connected therewith, over which or in which are placed the cooking utensils—may, for convenience, be termed the "pot-flues" or "cooking-flues."

Having thus described my invention, I claim and desire to secure by Letters Patent of the United States—

1. The combination, with the extended hearth and top of a cooking-stove, of the partition J, having the circular opening K and forming hot-air chambers, dampers pivoted with their rear ends to said partition and operating with their forward enlarged ends over said circular aperture, operating-rods pivoted to said dampers and projecting through holes in the sides of the stove, and a removably-secured magazine, substantially as set forth.

2. The combination, with the extended hearth and top of a cooking-stove having hot-air chambers, of a magazine communicating with said chambers and spring-actuated clamping-arms whereby the magazine is removably clamped to the top extension, substantially as set forth.

3. The combination, with the extended hearth and top of the cooking-stove having the hot-air chambers, of a magazine communicating with said air-chambers, spring-actuated clamping-arms, and an operating-lever connected thereto, substantially as set forth.

4. The combination, with the extended hearth and top of a cooking-stove having hot-air chambers, the extended hearth of which is provided with a series of slots and a downwardly-projecting cylindrical shell, of a fuel-magazine, clamping-arms projecting with their hooked ends through said slots, a coil-spring inclosed within said cylindrical shell, an operating-lever, a compound hook connecting said lever with said clamping-arms, and a guide and catch for the free ends of said lever.

5. The combination, with the pot-flues of a cooking-stove, of a removable top-burning straw and hay magazine having an open top registering with an opening in the under side of said flues, and a vertically-movable support or false bottom mounted on the stove-frame adapted to support said magazine and detachably connect the same to said flues, substantially as described.

6. The combination, with the pot-flues of a cooking-stove, of a removable top-burning straw or hay magazine having an open top registering with an opening in the under side of said flues, a vertically-movable support or false bottom mounted on the stove-frame adapted to support said magazine and detachably connect the same to said flue, and an operating-lever for effecting the vertical movement of said support, substantially as described.

7. The combination, with the pot-flues of a cooking-stove, of a removable fuel-magazine having an opening registering with said flues, a movable support for the magazine, and means for actuating said support to force the magazine into engagement with the flues, substantially as and for the purpose specified.

GODFRIED LAUBE.

In presence of—
F. H. PARKS,
ANTHONY J. STOEL.